Jan. 28, 1969 W. C. ANDERSON 3,424,980
ELECTRONIC DIVIDING SYSTEM FOR DETERMINING
THE RATIO OF TWO DIFFERENCES
Filed May 10, 1965
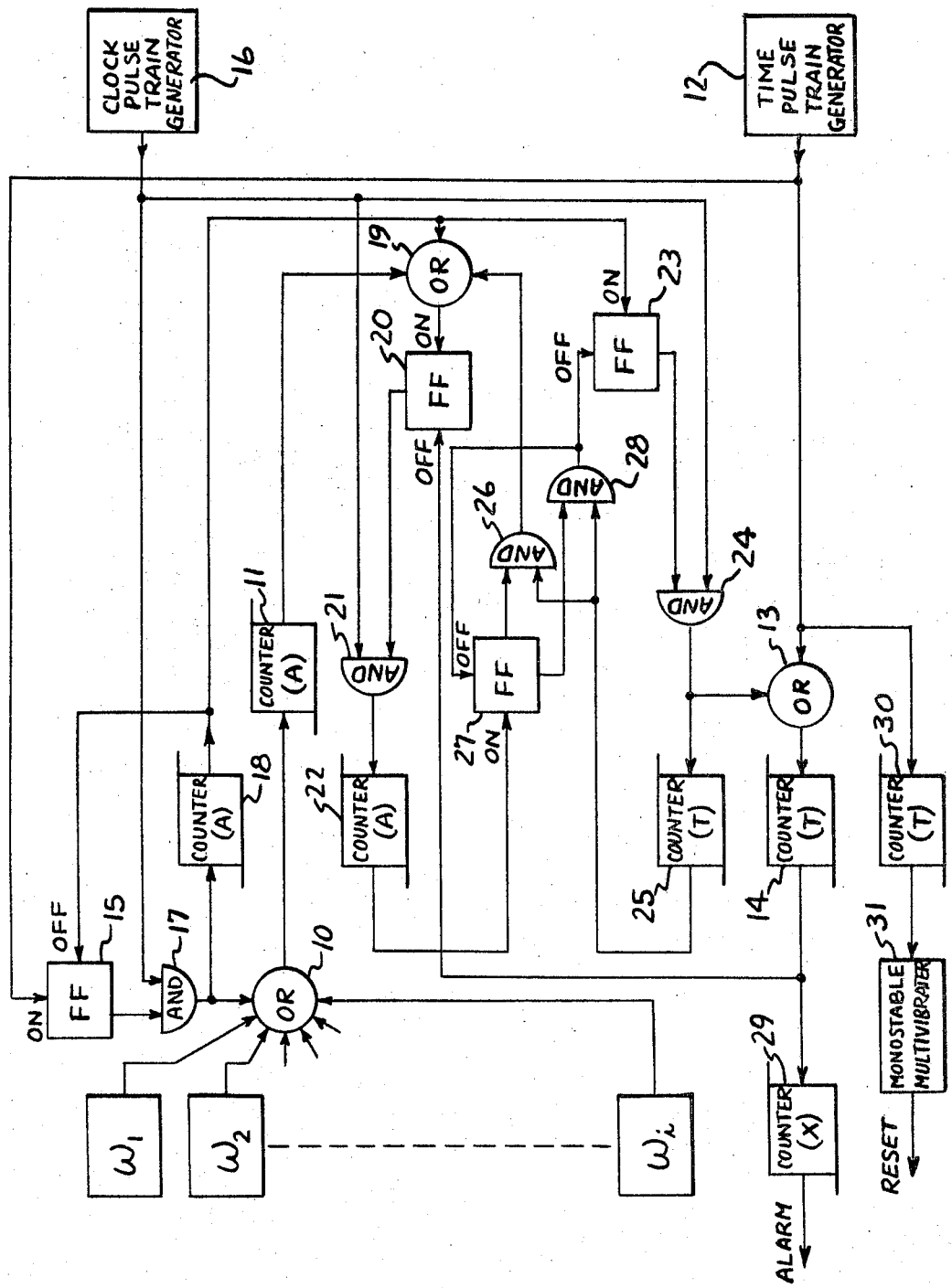
INVENTOR
WILMER C. ANDERSON
by: Louis Altman
ATTY.

United States Patent Office 3,424,980
Patented Jan. 28, 1969

3,424,980
ELECTRONIC DIVIDING SYSTEM FOR DETERMINING THE RATIO OF TWO DIFFERENCES
Wilmer C. Anderson, Greenwich, Conn., assignor to General Time Corporation, New York, N.Y., a corporation of Delaware
Filed May 10, 1965, Ser. No. 454,507
U.S. Cl. 324—103          8 Claims
Int. Cl. G01r 19/16

ABSTRACT OF THE DISCLOSURE

An electronic dividing system for determining the ratio of $$\frac{A-n}{T-t}$$

in which $n$ and $t$ are variables and $A$ and $T$ are constants. The system includes three pulse generators, one generating a series of pulses at a rate representative of the variable $n$, the second generating a series of pulses at a rate representative of the variable $t$, and the third generating a clock pulse train. A first counter having a capacity $A$ is responsive to the $n$ rate pulses, and is periodically actuated to count the clock pulses until it is filled, so that the number of clock pulses counted represents $A-n$. A second counter having a capacity $T$ is responsive to the $t$ rate pulses and is periodically actuated to count clock pulses until it is filled so that the number of clock pulses counted represents $T-t$. The counting of $T-t$ is repeated until the counting of $A-n$ is completed so that the number of $T-t$ counts represents the desired ratio. In one application of the ratio determining system, it is used as a power load anticipator for anticipating the rate of power dissipation over a predetermined demand interval.

---

The present invention relates generally to an improved electronic divider system, and more particularly to an improved electronic divider for determining the ratio of two differences. In one particular application of the invention, there is provided an improved power load anticipator for determining whether a utility substation is being fully utilized so that a proper balance can be maintained in the power distribution system.

It is a primary object of this invention to provide an electronic divider system which determines the difference between a first constant and a corresponding first variable, determines the difference between a second constant and a corresponding second variable, and then automatically determines the ratio of the first difference to the second difference. A related object is to provide such a system which automatically compares the resulting ratio with a predetermined constant.

Another object of the invention is to provide an electronic power load anticipator which determines the difference between the energy allocated for a predetermined demand interval and the energy actually used during a portion of that interval, determines the time remaining in the demand interval, and then determines the ratio of the energy difference to the remaining time. A related object is to provide such an anticipator which compares the resulting ratio with a predetermined constant representing the maximum limit for such ratio.

It is another object of the invention to provide a divider system of the foregoing type which can be constructed entirely from basic logic circuits and other well-known electronic circuits.

Other objects will become apparent from the following description taken in connection with the accompanying drawings, in which the single figure is a block diagram of the present invention as embodied in a power load anticipator system.

While the invention will be described in connection with certain specific embodiments, it will be understood that it is not intended to limit the invention to these embodiments, but, on the contrary, it is intended to cover such alternative embodiments, constructions and equivalents as may be included within the spirit and scope of the appended claims.

Referring now to the drawing, a typical utility substation metering system includes a plurality of watt-hour meters connected in a plurality of power lines for measuring the electrical load on such lines. Each of the watt-hour meters is conventionally provided with a cam and switch arrangement mounted on the shaft of the meter for feeding an electrical impulse into an associated demand recorder and/or anticipator each time the meter shaft rotates through a predetermined angular distance. Thus, it can be seen that each meter pulse output represents a known increment of load, so that the pulses can be totalized at predetermined intervals to provide an indication of the total load on the substation during such intervals. In the illustrative embodiment, the watt-hour meters are designated $W_1, W_2 \ldots W_i$, and the pulse outputs from these meters are all fed into a common OR gate 10.

In accordance with the present invention, there is provided an electronic system for determining the ratio of $$\frac{A-n}{T-t}$$

which system comprises the combination of a pulse train generator for generating a train of pulses at a substantially constant rate, first counting means for counting a number of pulses correspoding to $A-n$, second counting means for simultaneously counting a number of pulses corresponding to $T-t$ and continuously repeating the same until the first counting means has counted $A-n$ pulses, and means responsive to the first and second counting means for counting the number of $T-t$ counts completed by the second counting means within the period required for the $A-n$ count by the first counting means. In the ensuing discussion, it will be assumed that the various symbols have the following meanings:

$T$ = total time of measuring interval
$t$ = elapsed time since end of last measuring interval
$A$ = allocated watt-hours per measuring interval $T$
$n$ = number of watt-hours actually used during elapsed time $t$
$X$ = maximum limit for ratio of $$\frac{A-n}{T-t}$$

It is to be understood, however, that this invention is not limited to power load anticipating applications, but is equally applicable wherever it is desired to determine a ratio of the general type represented by the formula $$\frac{A-n}{T-t}$$

Referring now to the drawing, the watt-hour meters $W_1$ through $W_i$ feed pulses at a variable rate (typically about 25–35 pulses per second per meter) through OR gate 10 into a pulse counting circuit 11 having a capacity of A pulses, i.e., the counter 11 produces an output pulse whenever it has completed the counting of A pulses. As indicated above, the symbol A in the particular embodiment illustrated represents the allocated watt-hours for a measuring time interval T. In order to simplify the description of the inventive system, the capacity of each counter is indicated in parentheses, e.g., (A) for counter 11, in the block representing each counter in the attached drawing.

A number of different counting circuits may be used for the counter 11 and the other counters to be described, but one particular counter which is especially applicable for use in the present invention is the magnetic counting circuit described in Neitzert Patent No. 2,897,380, entitled "Magnetic Pulse Counting and Forming Circuits."

For the purpose of measuring the elapsed time $t$ of each measuring time interval, i.e., the elapsed time since the end of the last measuring interval, a time pulse train generator 12 supplies pulses at a constant rate, such as one pulse every three minutes, through an OR gate 13 to a pulse counter 14. The counter 14 has a capacity of T pulses, representing the total time of the measuring interval, and may be the same type of counter described above for counter 11. While counter 14 is counting $t$ time pulses generated at a constant rate by the time pulse train generator 12, the counter 11 is counting $n$ watt-hour pulses generated at a variable rate by the watt-hour meters $W_1$ through $Wi$. It will be appreciated from the examples given above that the time pulses from the generator 12 are produced at a substantially slower rate that the watt-hour pulses from the meters, e.g., one pulse per three minutes for the time pulses versus 25–35 pulses per second per meter for the watt-hour pulses.

In addition to measuring the elapsed time of each measuring interval, the time pulses from the generator 12 also serve to actuate a switching means 15 for initiating the flow of clock pulses from a clock pulse train generator 16 to the counter 11. Thus, in the illustrative embodiment, each time pulse from the generator 12 is applied to a flip-flop 15, thereby triggering the flip-flop to enable or open an AND gate 17. This initiates the flow of clock pulses from the generator 16 through the AND gate 17 and OR gate 10 to the counter 11. The clock pulses are generated at a relatively high rate compared with the rate of the watt-hour pulses from the meters $W_1$ through $Wi$ and the time pulses from the generator 12, so that the counter 11 quickly reaches its capacity of A pulses after the flow of clock pulses has been initiated. For example, a suitable rate for the clock pulses is 20,000 pulses per second.

Simultaneously with the initiation of the flow of clock pulses to the counter 11, the opening of the AND gate 17 also initiates the flow of clock pulses to a counter 18, which also has a capacity of A pulses. This counter 18 is empty at the time the AND gate 17 is opened, so that it must be filled with A clock pulses before it produces an output. The counter 11, on the other hand, already contains $n$ pulses when the AND gate 17 is opened, so that it produces an output after counting only $(A-n)$ clock pulses. Consequently, by the time counter 11 produces an output, counter 18 has counted only $(A-n)$ pulses.

When the counter 11 completes the counting of $(A-n)$ clock pulses, the resulting output pulse is fed through an OR gate 19 to trigger a flip-flop 20 and thereby enable or open an AND gate 21. The opening of AND gate 21 initiates the flow of clock pulses from the generator 16 to a counter 22 having a capacity of A pulses. It will be recognized that the counter 22 is thus actuated in response to the counting of $(A-n)$ clock pulses by counter 11, at which time counter 18 has also counted $(A-n)$ clock pulses but has not yet produced an output. Thereafter, counter 18 continues to count clock pulses simultaneously with counter 22 until counter 18 has completed the counting of A pulses, i.e., $n$ pulses after the actuation of counter 22. At this point, counter 18 produces an output pulse which turns off the flip-flop 15, thereby closing the AND gate 17 and terminating the flow of clock pulses to counters 11 and 18. Simultaneosuly, the output from counter 18 triggers a flip-flop 23 to enable or open an AND gate 24 and thereby initiate the flow of clock pulses through AND gate 24 and OR gate 13 to the counter 14.

It will be recognized that the counter 11 continues to count clock pulses after producing the output pulse which actuates counter 22, until the AND gate 17 is closed by the output from counter 18. Thus, counter 11 accumulates $n$ clock pulses before the flow of clock pulses thereto is terminated, so that the counter 11 is restored to its original condition at the time the flow of clock pulses was initiated. The counting of watt-hour pulses from the meters $W_1$ through $Wi$ thus continues until the counter 11 is eventually reset at the end of a measuring interval T.

Since counter 22 was not actuated until counter 18 had already counted $(A-n)$ clock pulses, it follows that counter 22 counts exactly $n$ clock pulses by the time the clock pulses are first applied to counter 14. Of course, counter 14 has previously counted $t$ time pulses from generator 12, so that counter 14 produces an output after counting only $(T-t)$ clock pulses. The output from counter 14 turns off the flip-flop 20, thereby disabling AND gate 21 and interrupting the flow of clock pulses to counter 22. It will be appreciated at this point that counter 14 started counting $(T-t)$ clock pulses at the same time that counter 22 started counting $(A-n)$ clock pulses. Consequently, when it is stated that the output from counter 14 interrupts the counting of 22, it is assumed that $(A-n)$ represents a value greater than $(T-t)$.

As the output from counter 18 turned on the flip-flop 23 to start the flow of clock pulses to counter 14, it simultaneously started the flow of clock pulses through AND gate 24 to a counter 25 having a capacity of T pulses. Since counter 25 was not previously actuated, it counts only $(T-t)$ pulses by the time counter 14 produces an output. Both counters 14 and 25 continue to count clock pulses after the output from counter 14 so that counter 25 produces an output $t$ pulses after the output from counter 14. The output from counter 25 passes through an AND gate 26, which is opened by a flip-flop 27 in its "off" state, and on through the OR gate 19 to turn on the flip-flop 20 again. This re-opens the AND gate 21, thereby resuming the flow of clock pulses to counter 22. Thus, it will be recognized that the counting of counter 22 has been interrupted for an interval of $t$ clock pulses, during which interval the counter 14 has again counted $t$ clock pulses. Consequently, counter 14 again commences the counting of $(T-t)$ pulses while counter 22 resumes the counting of $(A-n)$ pulses. When counter 14 has completed the counting of another T clock pulse, it again produces an output which turns off the flip-flop 20 and the cycle is repeated with counter 22 counting only during those intervals when counter 14 is counting $(T-t)$ pulses.

When the counter 22 finally accumulates A pulses, i.e., $(A-n)$ pulses after the commencement of the first $(T-t)$ count by counter 14, counter 22 produces an output pulse which turns on the flip-flop 27 thereby enabling or opening an AND gate 28. Thus, when the next output is produced by counter 25, it is passed through the open AND gate 28 to turn off the flip-flop 23, thereby disabling AND gate 24 and terminating the flow of clock pulses to counters 14 and 25. It can be seen that the final output from counter 25 is not produced until $t$ clock pulses after the output from counter 22, so that counter 14 accumulates $t$ pulses before the flow of clock pulses thereto is terminated by the closing of AND gate 24. Accordingly, the counter 14 is restored to its original condition when the flow of clock pulses was initiated. Thus, the counter 14 continues the counting of time pulses from the generator 12 until it is reset at the end of a measuring interval T.

When the final output pulse is produced by the counter 25, the AND gate 26 has been closed by the triggering of flip-flop 27 so that no pulses can be passed through the gate 26 to trigger the flip-flop 20. Consequently, the counter 22 is not actuated again until the next output from counter 18 after the next time pulse. As the final output from counter 25 passes through the AND gate 28 to turn off the flip-flop 23, it also turns off the flip-flop 27, thereby re-opening the AND gate 26 for the next cycle of operation during the next sub-interval.

To facilitate an understanding of the overall operation of the described divider system, it will be helpful to review the periods during which the various counters are counting clock pulses, as in the following chart:

| Capacity | Counter | Operative Periods for Counting Clock Pulses | | |
|---|---|---|---|---|
| | | (A-n) | n | (A-n) |
| | | T-t  t | T-t  t | T-t  t |
| A | 11 | S————O—X | | |
| A | 18 | S———————⊗ | | |
| A | 22 | | S————X | S——X  S—⊗— |
| T | 14 | | S—O————O | ——O—X |
| T | 25 | | S————O | ——O——⊗ |

S = starts counting clock pulses
O = output pulse produced
X = stops counting clock pulses
⊗ = stops counting and produces output pulse at same time The net result of the entire operation described above is that counter 22 counts $(A-n)$ pulses while counter 14 repeatedly counts $(T-t)$ pulses until the $(A-n)$ count has been completed by counter 22. Thus, the ratio of $$\frac{A-n}{T-t}$$

is indicated by the number of outputs produced by counter 14 before counter 22 produces an output. In order to count these outputs from counter 14 and thereby indicate the value of the ratio of $$\frac{A-n}{T-t}$$

a counter 29 is operatively connected to counter 14 to count the output pulses therefrom. In accordance with one feature of this invention, the counter 29 is provided with a capacity of X pulses corresponding to the maximum limit for the ratio $$\frac{A-n}{T-t}$$

Consequently, if the ratio ever exceeds this limit, as measured by the number of outputs from counter 14, the counter 29 produces an output pulse which may be used to actuate an alarm device to signal the operator that additional power can be fed to that particular substation so that he can take remedial steps. As long as the ratio is less than the maximum limit, no output pulse is produced by counter 29, and the alarm device is not actuated. Of course, if it is desired to record the ratio of $$\frac{A-n}{T-t}$$

for each sub-interval, i.e., for each interval between time pulses from the generator 12, an appropriate read-out device may be operatively associated with the counter 29 for the purpose of determining the number of output pulses produced by counter 14 for each sub-interval.

For the purpose of resetting the system at the end of each measuring interval T, a counter 30 accumulates time pulses from the time pulse train generator 12 continuously until it has counted T pulses. The counter 30 then produces an output which triggers a monostable multivibrator 31 which is operatively connected to all the system counters 11, 14, 18, 22, 25, 29 and 30 for resetting the same.

The system described above employs conventional static and dynamic logic circuitry, and each of the logic elements may be a basic circuit which is well known to those skilled in the electronic art. For example, the flip-flops, AND gates, and OR gates are all fundamental electronic building blocks and no detailed discussion thereof is necessary. As mentioned above, the counters may be of the magnetic core type described in the Neitzert Patent 2,897,380.

As can be seen from the foregoing detailed description, this invention provides an electronic divider system which determines the difference between a first constant and a corresponding first variable, determines the difference between a second constant and a corresponding second variable, and then automatically determines the ratio of the first difference to the second difference and, if desired, compares that ratio with a predetermined constant. In the particular embodiment illustrated, the present invention provides a power load anticipator which determines the difference between the energy allocated for a given demand interval and the energy actually used during a certain portion of that interval, determines the time remaining in the demand interval, and then automatically determines the ratio of the energy different to the remaining time and compares that ratio with a known factor. Of course, the invention is not limited to power load anticipating applications; for example, the illustrative system may be used in a number of different applications where it is desired to determine whether a certain medium is being dissipated at a lesser rate than desired during a prescribed time period.

I claim as my invention:

1. A system for determining the ratio of $$\frac{A-n}{T-t}$$

in which $n$ and $t$ are variables and A and T are constants, which system comprises the combination of means for generating a first series of pulses at a rate representative of said variable $n$, means for generating a second series of pulses at a rate representative of said variable $t$, means for generating a clock pulse train, first counting means having a capacity corresponding to A and responsive to said first series of pulses representative of $n$, first control means operatively connected to said first counting means and said clock pulse generating means for rendering said first counting means responsive to said clock pulse train for counting a number of said clock pulses corresponding to $(A-n)$, second counting means having a capacity corresponding to T and responsive to said second series of pulses representative of $t$, second control means operatively connected to said second counting means and said clock pulse generating means for rendering said second counting means responsive to said clock pulse train for respectively counting a number of said clock pulses corresponding to $(T-t)$, and third counting means responsive to said first and second counting means for counting the number of $(T-t)$ counts completed by said second counting means for each $(A-n)$ count completed by said first counting means.

2. A system for determining the ratio of $$\frac{A-n}{T-t}$$

in which T is a constant representing the total time of a measuring interval, $t$ is a variable representing the elapsed time in said interval T, A is a constant representing the amount of a certain medium allocated for use during said measuring interval T, and $n$ is a variable representing the amount of said medium actually used during the elapsed time $t$, which system comprises the combination of first pulse generator means for producing first pulses representative of the amount of said medium actually used, a first pulse counter responsive to said first generator means for counting said first pulses with the capacity of said first counter corresponding to A and the instantaneous count thereof corresponding to $n$, second pulse generator means for producing second pulses representative of the elapsed time, a second pulse counter responsive to said second generator means for counting said second pulses with the capacity of said second counter corresponding to T and the instantaneous count thereof corresponding to $t$, third pulse generator means for producing clock pulses at a rate substantially higher than the rate of said first and second pulses and operatively connected to said first and second counters, control means operatively connected to said first and second counters for periodically actuating said first and second counters to count said clock pulses thereby periodically filling said first and second counters to determine the values of $(A-n)$ and $(T-t)$, respectively, and a ratio measuring circuit responsive to said first and second counters and including a third pulse counter for counting the number of $(T-t)$ clock pulses counted for each count of $(A-n)$ clock pulses.

3. A system for determining the ratio of $$\frac{A-n}{T-t}$$

in which T is a constant representing the total time of a measuring interval, $t$ is a variable representing the elapsed time in said interval T, A is a constant representing the amount of a certain medium allocated for use during said measuring interval T, and $n$ is a variable representing the amount of said medium actually used during the elapsted time $t$, which system comprises the combination of first pulse generator means for producing first pulses representative of the amount of said medium actually used, a first pulse counter responsive to said first generator means for counting said first pulses with the capacity of said first counter corresponding to A and the instantaneous count thereof corresponding to $n$, second pulse generator means for producing second pulses representative of the elapsed time, a second pulse counter responsive to said second generator means for counting said second pulses with the capacity of said second counter corresponding to T and the instantaneous count thereof corresponding to $t$, third pulse generator means for producing clock pulses at a rate substantially higher than the rate of said first and second pulses and operatively connected to said first and second counters, control means operatively connected to said first and second counters for periodically actuating said first and second counters to count said clock pulses thereby periodically filling said first and second counters to determine the values of $(A-n)$ and $(T-t)$, respectively, a ratio measuring circuit responsive to said first and second counters and including a third pulse counter for counting the number of $(T-t)$ clock pulses counted for each count of $(A-n)$ clock pulses, and means for restoring said first counter to its $n$ count and said second counter to its $t$ count upon each ratio measurement to enable repetition of said ratio measurement for successively increasing $n$ and $t$ values.

4. A system for determining the ratio of $$\frac{A-n}{T-t}$$

in which T is a constant representing the total time of a measuring interval, $t$ is a variable representing the elapsed time in said interval T, A is a constant representing the amount of a certain medium allocated for use during said measuring interval T, and $n$ is a variable representing the amount of said medium actually used during the elapsed time $t$, which system comprises the combination of first pulse generator means for producing first pulses representative of the amount of said medium actually used, a first pulse counter responsive to said first generator means for counting said first pulses with the capacity of said first counter corresponding to A and the instantaneous count thereof corresponding to $n$, second pulse generator means for producing second pulses representative of the elapsed time, a second pulse counter responsive to said second generator means for counting said second pulses with the capacity of said second counter corresponding to T and the instantaneous count thereof corresponding to $t$, third pulse generator means for producing clock pulses at a rate substantially higher than the rate of said first and second pulses and operatively connected to said first and second counters, control means operatively connected to said first and second counters for periodically actuating said first and second counters to count said clock pulses thereby periodically filling said first and second counters to determine the values of $(A-n)$ and $(T-t)$, respectively, a ratio measuring circuit responsive to said first and second counters and including a third pulse counter for counting the number of $(T-t)$ clock pulses counted for each count of $(A-n)$ clock pulses, and means for resetting all of said counters at the end of each measuring interval T.

5. A power load anticipator system for determining the ratio of power dissipation from a plurality of power lines over a predetermined demand interval, which system comprises the combination of a watt-hour meter connected in each of said lines and an impulse generator actuated by each of said meters to provide an output of pulses proportional to the amount of energy used on each of said lines, a first counter for receiving and counting said output pulses from said meters and providing an output in response to the counting of A pulses, a clock pulse generator providing an output of pulses at a constant rate substantially higher than the rate of output pulses from said meters, a gate means for controlling the application of said clock pulses to said first counter and means for energizing said gate means at predetermined sub-intervals during said demand interval, said meters supplying $n$ pulses and said clock pulse generator supplying $(A-n)$ pulses to said first counter during each sub-interval, a second counter responsive to the energization of said gate means for receiving and counting said clock pulses and providing an output in response to the counting of A pulses, the counting of said second counter commencing simultaneously with the counting of said $(A-n)$ pulses by said first counter, a third counter responsive to the output of said first counter for receiving and counting A clock pulses, an elapsed time pulse generator for providing an output of time pulses at a predetermined constant rate, a fourth counter for receiving and counting said time pulses and providing an output in response to the counting of T pulses, gate means responsive to the output of said second counter, after the counting of $t$ time pulses by said fourth counter, for supplying said clock pulses to said fourth counter, means responsive to the output of said fourth counter for interrupting the counting of said third counter until said fourth counter has counted $t$ pulses and then starting the counting of said third counter again until the next output from said fourth counter and so on with said third counter being actuating only during the counting of $(T-t)$ pulses by said fourth counter during each repetitive cycle, and a fifth counter responsive to the outputs of said third and fourth counter for counting the number of $(T-t)$ pulse counts by said third counter before the completion of the A pulse count by said third counter.

6. A system for determining the ratio of $$\frac{A-n}{T-t}$$

which comprises the combination of first generating means for generating pulses at a variable rate, second generating means for generating pulses at a substantially constant rate, first counting means for counting $n$ of said variable rate pulses and then $(A-n)$ of said constant rate pulses, second counting means for counting A of said constant rate pulses in response to the commencement of the counting of said $(A-n)$ of said constant rate pulses by said first counting means, third counting means for counting A of said constant rate pulses in response to the completion of the counting of said $(A-n)$ of said constant rate pulses by said first counting means, fourth counting means for counting $(T-t)$ of said constant rate pulses in response to the completion of the counting of said A of said constant rate pulses by said second counting means whereby the counting of $(T-t)$ pulses commences simultaneously with the completion of the counting of $n$ pulses by said third counting means, and means responsive to said third and fourth counting means for counting the number of times said fourth counting means counts said $(T-t)$ pulses before the completion of the counting of said A pulses by said third counting means.

7. A system for determining the ratio of $$\frac{A-n}{T-t}$$

which comprises the combination of first generating means for generating pulses at a substantially constant first rate, second generating means for generating pulses at a substantially constant second rate, first counting means for counting $(A-n)$ of said second rate pulses, second counting means for counting $t$ of said first rate pulses and then counting $(T-t)$ of said second rate pulses simultaneously with the counting of said $(A-n)$ second rate pulses by said first counting means, said second counting means being adapted to continuously repeat counting T of said second rate pulses until the completion of the counting of said $(A-n)$ second rate pulses by said first counting means, means responsive to said second counting means for deactivating said first counting means to interrupt the counting of said $(A-n)$ pulses during the counting of the first $t$ pulses in each repetitive counting of T pulses by said second counting means, and means responsive to said first and second counting means for counting the number of times said second counter means counts T pulses before the completion of the counting of said $(A-n)$ pulses by said first counting means.

8. A system for determining the ratio of $$\frac{A-n}{T-t}$$

which comprises the combination of first generating means for generating pulses at a variable rate, second generating means for generating pulses at a first constant rate, third generating means for generating pulses at a second constant rate, first counting means for counting $n$ of said variable rate pulses ad then $(A-n)$ of said second constant rate pulses, second counting means for counting A of said second constant rate pulses in response to the commencement of the counting of said $(A-n)$ of said second constant rate pulses by said first counting means, third counting means for counting A of said second constant rate pulses in response to the completion of the counting of said $(A-n)$ of said second constant rate pulses by said first counting means, fourth counting means for counting $t$ of said first constant rate pulses simultaneously with the counting of $n$ of said variable rate pulses by said first counting means and then counting $(T-t)$ of said second constant rate pulses in response to the completion of the counting of said A of said second constant rate pulses by said second counting means whereby the counting of $(T-t)$ pulses commences simultaneously with the counting of $(A-n)$ pulses by said third counting means, said fourth counting means being adapted to continuously repeat counting T of said second constant rate pulses until the completion of the counting of said $(A-n)$ pulses by said third counting means, means responsive to said fourth counting means for deactivating said third counting means to interrupt the counting of said $(A-n)$ pulses during the counting of the first $t$ pulses in each repetitive counting of T pulses by said fourth counting means, and means responsive to said third and fourth counting means for counting the number of times said second counting means counts $(T-t)$ pulses within the period required for the third counting means to count $(A-n)$ pulses.

References Cited
UNITED STATES PATENTS

| | | |
|---|---|---|
| 2,851,596 | 9/1958 | Hilton. |
| 2,880,612 | 4/1959 | Coyne et al. _____ 324—79 XR |
| 2,965,891 | 12/1960 | Martin _____ 324—99 XR |
| 2,998,917 | 9/1961 | Wernie _____ 235—151.21 |
| 3,229,110 | 1/1966 | Kleinbach et al. __ 235—151.21 |
| 3,233,176 | 2/1966 | Iben _____ 324—140 XR |

RUDOLPH V. ROLINEC, Primary Examiner.

E. K. KARLSEN, Assistant Examiner.

U.S. Cl. X.R.

235—151.21; 324—103